US012322778B2

(12) United States Patent
Puglia et al.

(10) Patent No.: US 12,322,778 B2
(45) Date of Patent: Jun. 3, 2025

(54) COMPACT TEMPERATURE CONTROL SYSTEM AND METHOD FOR ENERGY MODULES

(71) Applicants: LAWRENCE LIVERMORE NATIONAL SECURITY, LLC, Livermore, CA (US); EAGLEPICHER TECHNOLOGIES, LLC, St. Louis, MO (US)

(72) Inventors: Frank Puglia, East Greenwich, RI (US); Ralph Roark, North Stonington, CT (US); Gregory J. Moore, Griswold, CT (US); Arthur Dobley, East Greenwich, RI (US); Thomas J. McCarville, Tracy, CA (US); John Chang, Danville, CA (US); Jacquelyn N. Etter, Livermore, CA (US); Jack Kotovsky, Alameda, CA (US); Rudy Robles, Livermore, CA (US); Eric M. Ziebarth, San Leandro, CA (US)

(73) Assignees: Lawrence Livermore National Security, LLC, Livermore, CA (US); Eaglepicher Technologies, LLC, St. Louis, MO (US)

( * ) Notice: Subject to any disclaimer, the term of this patent is extended or adjusted under 35 U.S.C. 154(b) by 943 days.

(21) Appl. No.: 17/052,760

(22) PCT Filed: May 2, 2019

(86) PCT No.: PCT/US2019/030381
§ 371 (c)(1),
(2) Date: Nov. 3, 2020

(87) PCT Pub. No.: WO2020/046431
PCT Pub. Date: Mar. 5, 2020

(65) Prior Publication Data
US 2021/0234214 A1    Jul. 29, 2021

Related U.S. Application Data

(60) Provisional application No. 62/666,441, filed on May 3, 2018.

(51) Int. Cl.
*H01M 10/6557* (2014.01)
*F28D 1/03* (2006.01)
(Continued)

(52) U.S. Cl.
CPC ...... *H01M 10/6557* (2015.04); *F28D 1/0316* (2013.01); *F28F 3/12* (2013.01);
(Continued)

(58) Field of Classification Search
CPC ............ H01M 10/651; H01M 10/653; H01M 10/6557; H01M 10/613; H01M 10/6555; F28D 1/0316
See application file for complete search history.

(56) References Cited

U.S. PATENT DOCUMENTS

2006/0214641 A1   9/2006  Cho
2010/0257883 A1*  10/2010  Damsohn ............ H01M 10/625
                                                    429/120
(Continued)

FOREIGN PATENT DOCUMENTS

CN       106329026 A       1/2017
DE   102018219980 A1 *    5/2020
(Continued)

OTHER PUBLICATIONS

EPO machine generated English translation of WO-2016080696-A1 (Year: 2016).*
(Continued)

Primary Examiner — Sean P Cullen

*Assistant Examiner* — Kimberly Wyluda
(74) *Attorney, Agent, or Firm* — HARNESS, DICKEY & PIERCE, P.L.C.

(57) ABSTRACT

The present disclosure relates to an energy module having a plurality of energy generating cells, and at least one cooling plate having opposing surfaces. The cooling plate is disposed between an adjacent pair of the energy generating cells such that the opposing surfaces of the cooling plate are in contact with surfaces of the adjacent pair of energy generating cells. The cooling plate has at least one coolant flow channel configured to receive a coolant flow therethrough to limit propagation of heat from one to the other of either one of the adjacent pair of energy generating cells when either one of the adjacent pair of energy generating cells fails.

10 Claims, 5 Drawing Sheets

(51) Int. Cl.
| | |
|---|---|
| *F28F 3/12* | (2006.01) |
| *H01M 10/613* | (2014.01) |
| *H01M 10/6555* | (2014.01) |
| *H01M 50/209* | (2021.01) |
| *H01M 50/293* | (2021.01) |
| *F28D 21/00* | (2006.01) |
| *H01M 10/651* | (2014.01) |
| *H01M 10/653* | (2014.01) |

(52) U.S. Cl.
CPC ..... *H01M 10/613* (2015.04); *H01M 10/6555* (2015.04); *H01M 50/209* (2021.01); *H01M 50/293* (2021.01); *F28D 2021/0029* (2013.01); *H01M 10/651* (2015.04); *H01M 10/653* (2015.04)

(56) References Cited

U.S. PATENT DOCUMENTS

| | | | |
|---|---|---|---|
| 2011/0056668 A1* | 3/2011 | Taras | F28F 9/262 165/174 |
| 2011/0143247 A1 | 6/2011 | An et al. | |
| 2016/0359206 A1* | 12/2016 | Eberleh | H01M 10/613 |
| 2018/0183119 A1* | 6/2018 | Ju | H01M 50/502 |
| 2020/0006820 A1* | 1/2020 | Cha | H01M 10/6556 |

FOREIGN PATENT DOCUMENTS

| | | | | |
|---|---|---|---|---|
| GB | 2538331 A | * | 11/2016 | .......... H01M 10/613 |
| KR | 10-2006-0102851 A | | 9/2006 | |
| KR | 101619449 B1 | | 5/2016 | |
| WO | WO-2012138833 A2 | | 10/2012 | |
| WO | WO-2016080696 A1 | * | 5/2016 | ............ H01M 10/04 |

OTHER PUBLICATIONS

EPO machine generated English translation of DE-102018219980-A1 (Year: 2020).*
International Search Report and Written Opinion issued in International Application No. PCT/US2019/030381, dated Mar. 27, 2020; ISA/KR.

* cited by examiner

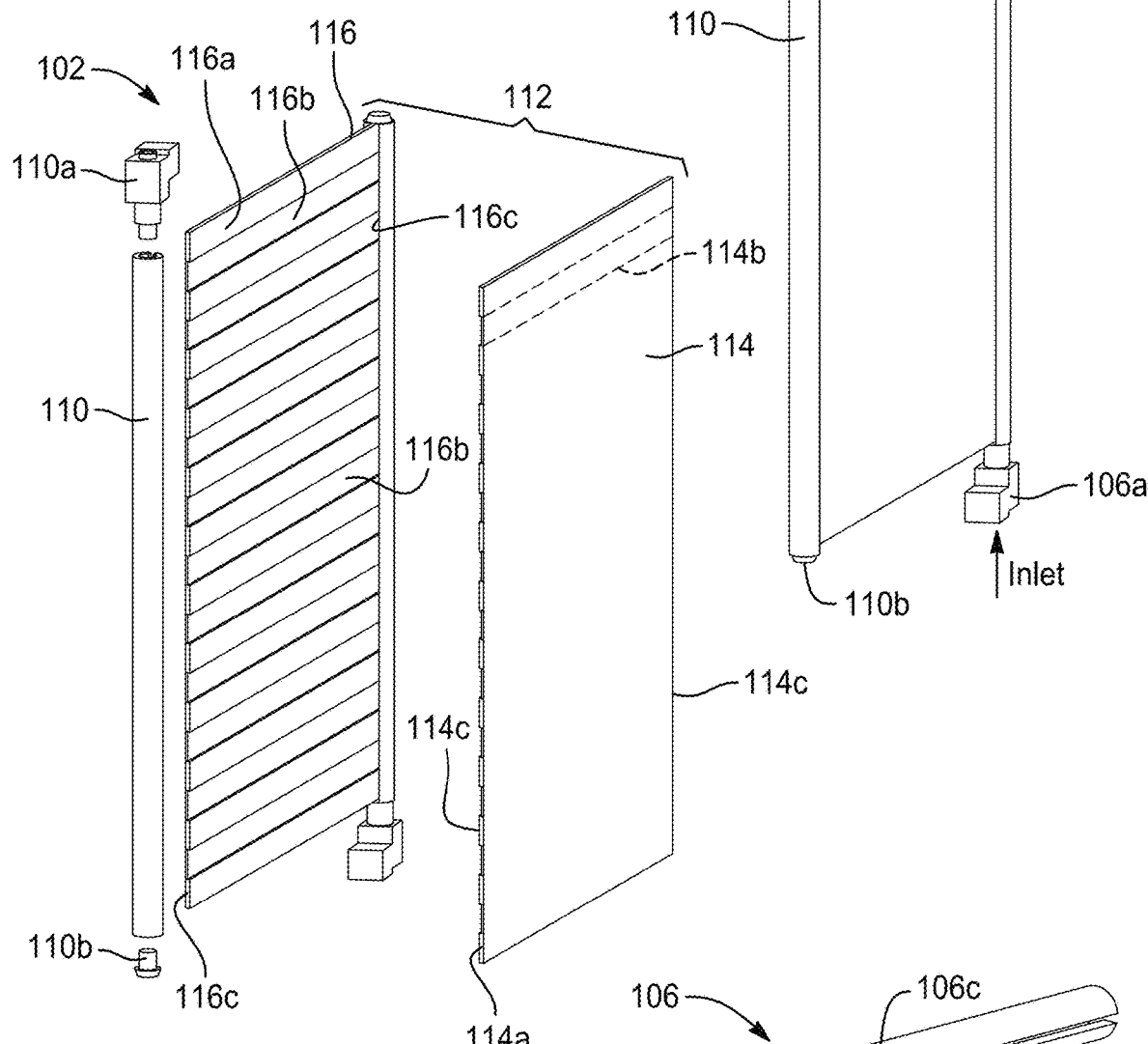
FIGURE 3
FIGURE 4
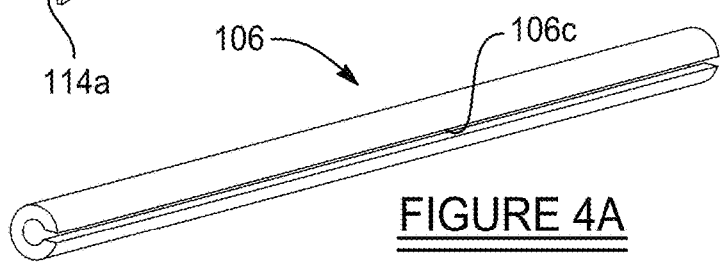
FIGURE 4A

COMPACT TEMPERATURE CONTROL SYSTEM AND METHOD FOR ENERGY MODULES

CROSS-REFERENCE TO RELATED APPLICATIONS

This application is the U.S. National Phase Application under 35 U.S.C. 371 of International Application No. PCT/US2019/030381 filed on May 2, 2019, which claims the benefit of U.S. Provisional Application No. 62/666,441 filed on May 3, 2018. The entire disclosures of the above applications are incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to thermal control systems for energy storage devices, and more particularly to a temperature control system and method which limits cell failure propagation within an energy storage module, while still preserving the module's high energy storage density.

BACKGROUND

This section provides background information related to the present disclosure which is not necessarily prior art.

Energy storage modules are typically constructed from a collection of individually packaged cells, tightly packed for high energy density. Individual cell failure within a model can be electronically sensed to compensate for output performance. But when single cell failure results in significant localized heat release within the module, thermal conduction can propagate the failure to multiple cells, producing a sudden and catastrophic energy release. As a result, the hazard associated with cell failure propagation remains a limiting factor for market applications that place high value on personnel and equipment safety.

Traditional passive approaches to limiting temperature rise within a failed energy storage cell (e.g., failed battery cell, capacitor, fuel cell, etc.) are generally straightforward. One passive approach leverages heat capacity of cells adjacent to the failed cell. However, with lithium ion battery material, for example, the low thermal conductivity of the battery material in the cell stacking direction makes this an ineffective strategy for suppressing cell failure propagation. Energy is not conducted fast enough from a failed cell into cooler neighboring cells to suppress significant temperature rise at the contact surface between cells.

Separating adjacent cells with a phase change material is an extension of the passive approach. See, e.g., Zalba et al., "Review on Thermal Energy Storage with Phase Change: Materials, Heat Transfer Analysis and Applications", Applied Thermal Engineering, 23 (2003), pp. 251-283. The interstitial material changes phase from solid to liquid as heat is conducted out of a failed cell. The interstitial material temperature remains constant during phase change, limiting the neighboring cell temperature rise. But the volume of interstitial material required by this concept significantly reduces the average energy density of an energy storage module.

If active cooling is introduced, it is possible to conduct heat heat from the cell interior to external heat sinks. The cell material's highly bi-directional thermal conductivity implies a preferred direction for heat transport. For planar cells, heat is transported relatively easily through cell material in two directions perpendicular to the stacking axis, while each cell is a thermal insulator in the direction along the stacking axis. This property limits the removal of heat from a battery module's interior using exterior heat sinks. Thermal simulations show a module would have to have a high aspect ratio to eliminate cell failure using external heat sinks, severely limiting cell manufacturing and module packaging options.

Conduction from the module interior is enhanced if high thermal conductivity plates, anchored to an exterior heat sink, are inserted between each cell. The contact temperature between cells will be reduced as the thermal conductivity and thickness of each plate increases. Numerical simulations for typical module cell dimensions show the required plate thickness would significantly the module energy density, making this an unattractive alternative.

The plate thickness required to remove heat from the module interior is somewhat reduced if a highly insulating layer is added between each cell, along with a high conductivity plate. The insulation slows the heat flow rate into the neighboring cell, encouraging heat transport along the conducting plate to an exterior heat sink. But there are practical limits on the effectiveness of available insulating materials. Numerical simulations using the baseline module geometry suggest this approach is not a robust method of suppressing cell failure propagation.

Heat pipe technology was considered for transferring heat more efficiency from the module interior to exterior heat sinks. In some geometries, heat pipes are much more efficient at transferring heat than an equivalent thickness of high thermal conductivity material. For example, see the work of Zeru, B. A. "*Experimental Studies on a Flat Plate Heat Pipe for Electronic Cooling*", Jimma University Annual Research Conference Proceedings, Vol. 1, 2010, pp. 145-157. But the limiting heat removal rate of a heat pipe decreases as it becomes long and thin. The heat removal capacity of a heat pipe is ineffective when the internal flow stalls. The long, thin heat pipes required to remove heat from a battery module without significantly reducing module energy density are susceptible to stalled internal flow.

Accordingly, a need exists for a system and method which significantly reduces or eliminates the risk of cell failure propagation in a multi-cell energy storage module, but without compromising the high energy density inherent in the module.

SUMMARY

This section provides a general summary of the disclosure, and is not a comprehensive disclosure of its full scope or all of its features.

In one aspect the present disclosure relates to an energy module. The energy module may comprise a plurality of energy generating cells, and at least one cooling plate having opposing surfaces. The at least one cooling plate is disposed between an adjacent pair of said plurality of energy generating cells such that the opposing surfaces of the at least one cooling plate are in contact with surfaces of the adjacent pair of energy generating cells. The at least one cooling plate further includes at least one coolant flow channel configured to receive a coolant flow therethrough to limit propagation of heat from one to the other of either one of the adjacent pair of energy generating cells when either one of the adjacent pair of energy generating cells fails.

In another aspect the present disclosure relates to an energy module. The energy module may comprise a plurality of energy generating cells spaced parallel to one another, and a plurality of cooling plates having opposing surfaces. Each one of the cooling plates is disposed between an associated adjacent pair of said plurality of energy generating cells such that the opposing surfaces of the at least one cooling plate are in contact with surfaces of the cooling plate's associated adjacent pair of energy generating cells. Each one of the cooling plates may include a plurality of coolant flow channels extending internally within the cooling plate from a first longitudinal edge to a second longitudinal edge opposite the first longitudinal edge. Each of the coolant flow channels is further configured to receive a coolant flow therethrough to limit propagation of heat from one to the other of either one of its associated adjacent pair of energy generating cells, when either one of the associated adjacent pair of energy generating cells fails.

In still another aspect the present disclosure relates to a method of making a cooling plate for an energy module. The method comprises dimensioning first and second material sections to have a height and a width approximately equal to a height and width of an energy generating cell. The method further includes removing sections of material from at least one of the first and second material sections to at least partially form a plurality of flow channels therethrough, from a first longitudinal edge to a second longitudinal edge of thereof. The method further includes securing the first and second material sections together to fully form the plurality of flow channels, and such that the first and second material sections form a unitary assembly. The method still further includes securing an inlet manifold to the first longitudinal edge to enable a coolant to be fed into the fully formed flow channels, and securing an outlet manifold to the second longitudinal edge to enable the coolant flowing through the plurality of fully formed flow channels to be received. The method further includes dimensioning a thickness of the unitary assembly such that the thickness is no more than 10% of an overall thickness of the energy generating cell.

In still another aspect the present disclosure relates to a method of making a cooling plate for an energy module. The method may comprise dimensioning first and second material sections to have a height and a width approximately equal to a height and width of an energy generating cell. The method further includes removing sections of material from at least one of the first and second material sections to at least partially form a plurality of flow channels therethrough, from a first longitudinal edge to a second longitudinal edge of thereof. The method further includes securing the first and second material sections together to fully form the plurality of flow channels, and such that the first and second material sections form a unitary assembly. The method further includes securing an inlet manifold to the first longitudinal edge to enable a coolant to be fed into the fully formed flow channels, and securing an outlet manifold to the second longitudinal edge to enable the coolant flowing through the plurality of fully formed flow channels to be received. The method further includes dimensioning a thickness of the unitary assembly such that the thickness is no more than 10% of an overall thickness of the energy generating cell.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In the drawings:

FIG. 3 is a high level perspective view of just one cooling plate in accordance with one embodiment of the present disclosure;

FIG. 4 is an exploded perspective view showing the individual component parts that are used to construct the cooling plate of FIG. 3;

FIG. 4A is a plan view of just a portion of the intake manifold showing the slit formed along a majority of its length;

Corresponding reference numerals indicate corresponding parts throughout the several views of the drawings.

DETAILED DESCRIPTION

Example embodiments will now be described more fully with reference to the accompanying drawings.

The present disclosure relates to a reliable system and method for preventing cell failure propagation in energy storage modules. The present disclosure is expected to enable the use of energy storage modules in applications where preventing equipment damage and personal injury are significant considerations.

This present disclosure was developed in part with consideration of nominal design parameters for a battery module with multiple planar Lithium ion battery cells, and numerically simulating the thermal response when a single cell fails. These simulations helped the co-inventors in developing the subject matter of the present disclosure. Tests were conducted utilizing the embodiments described herein, wherein live cells were driven to failure. The tests demonstrated neighboring cells are well protected from failure propagation by the embodiments of the present disclosure.

In numerical simulations of single cell failure performed by the co-inventors, module dimensions were 15×15×15 $cm^3$. The individual cell thickness was varied from 5 to 20 mm, while holding the cell material stored energy density constant at 1 joule/$mm^3$. Varying the cell thickness in the simulations provided a more complete understanding of the various embodiments described herein, and insight for additional planned testing.

Figure 1:
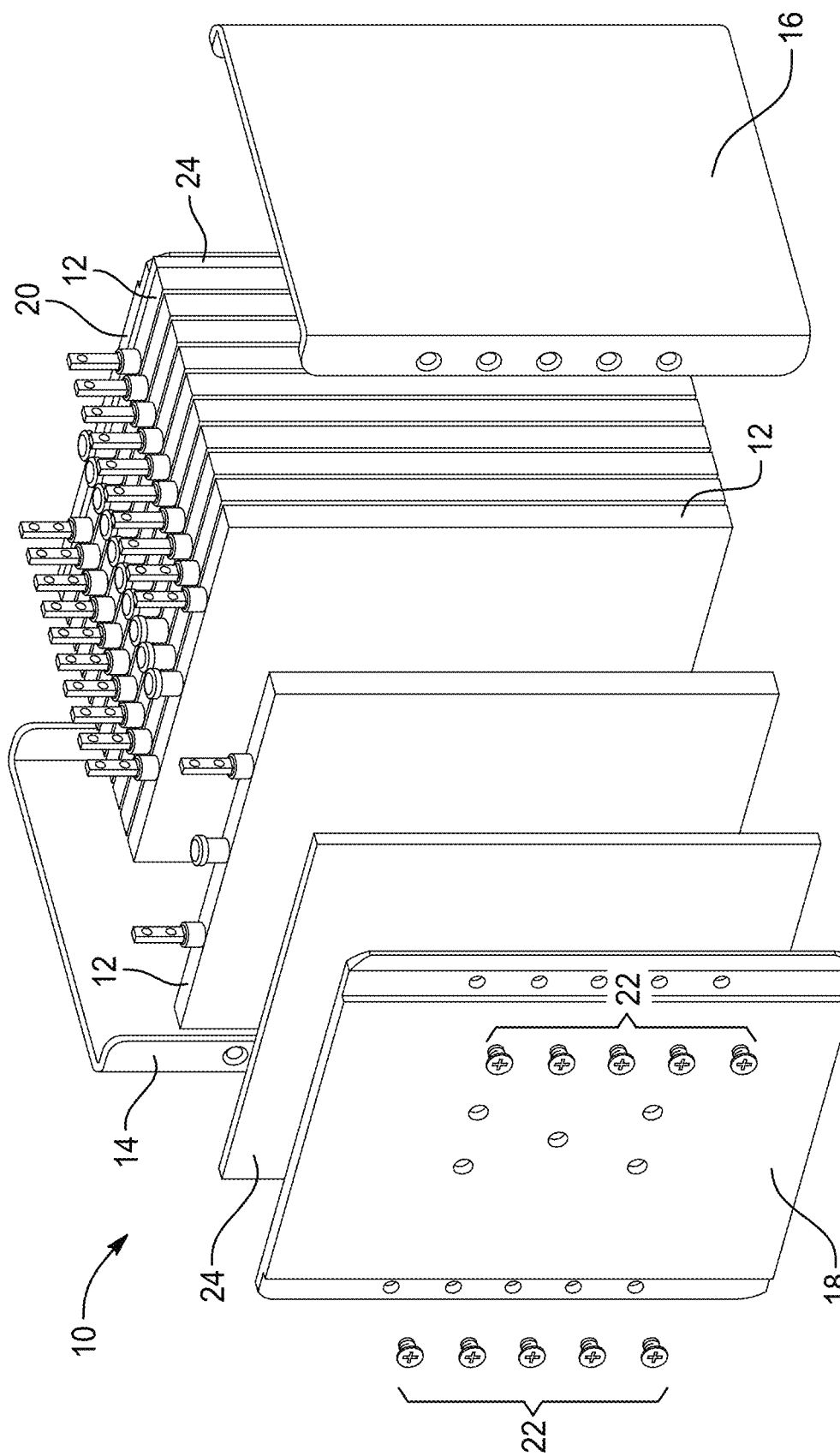
FIG. 1 is a high level diagram illustrating one example of a construction of a prior art, multi-cell energy storage module.

In the above-mentioned simulations, a failed cell was assumed to release its energy uniformly within the cell volume, over nominally ten seconds. The temperature vs. time history calculated throughout the module was used to predict the onset of cell failure propagation. The general arrangement of cell stacking within a prior energy storage module is illustrated in FIG. 1.

An important criterion for suppressing failure propagation is to limit the contact temperature between neighboring energy storage cells. If the contact temperature at a failed cell increases above around 100° C., exothermic reactions may be initiated in the neighboring cell. The heat released by a single failed cell can then become a self-propagating failure that traverses throughout the module. Thus, an important objective for robust cell failure protection is to limit the contact surface temperature between neighboring cells.

A second criterion for module protection from single cell failure is that the protection method should not significantly reduce the module energy density. The criterion applied here is the component for system used to prevent cell failure propagation should reduce the module energy density by less than 10%. However, it should be understood that in some applications, the use of the embodiments presented herein may still provide significant benefits when integrated into an energy module even though the energy module's average energy density may be reduced by slightly more than 10%.

A third important criterion for a component/system which is integrated into an energy module is that it must not significantly complicate assembly of individual cells into a module, or introduce new technical uncertainties in the construction of the module. This goal is met by the cooling plates of the present disclosure as individual components, whose quality can be inspected and verified, similar to inspection of individual battery cells, prior to their assembly into an energy storage module. Coolant may be distributed to individual cooling plates within a module by a fluid distribution manifold, analogous to the way battery current and voltage are managed during module assembly.

The present disclosure addresses the above-mentioned considerations in a unique way. The present disclosure focuses on preventing cell failure propagation within a multi-cell energy storage module by flowing a temperature controlled fluid directly between the contact area of each pair of adjacent cells of the module. FIG. 1 illustrates a conventional (prior art) energy module 10 having a plurality of adjacently positioned energy storage cells 12. Cover members 14, 16, 18 and 20 are used to enclose the cells 12 and may be held together by pluralities of threaded screws 22 (only one plurality being shown in FIG. 1). Panels 24 represent a thin electrical insulation layer commonly used to electrically isolate adjacent cells 12 from each other and the module cover members 14,16,18,20.

Figure 2:
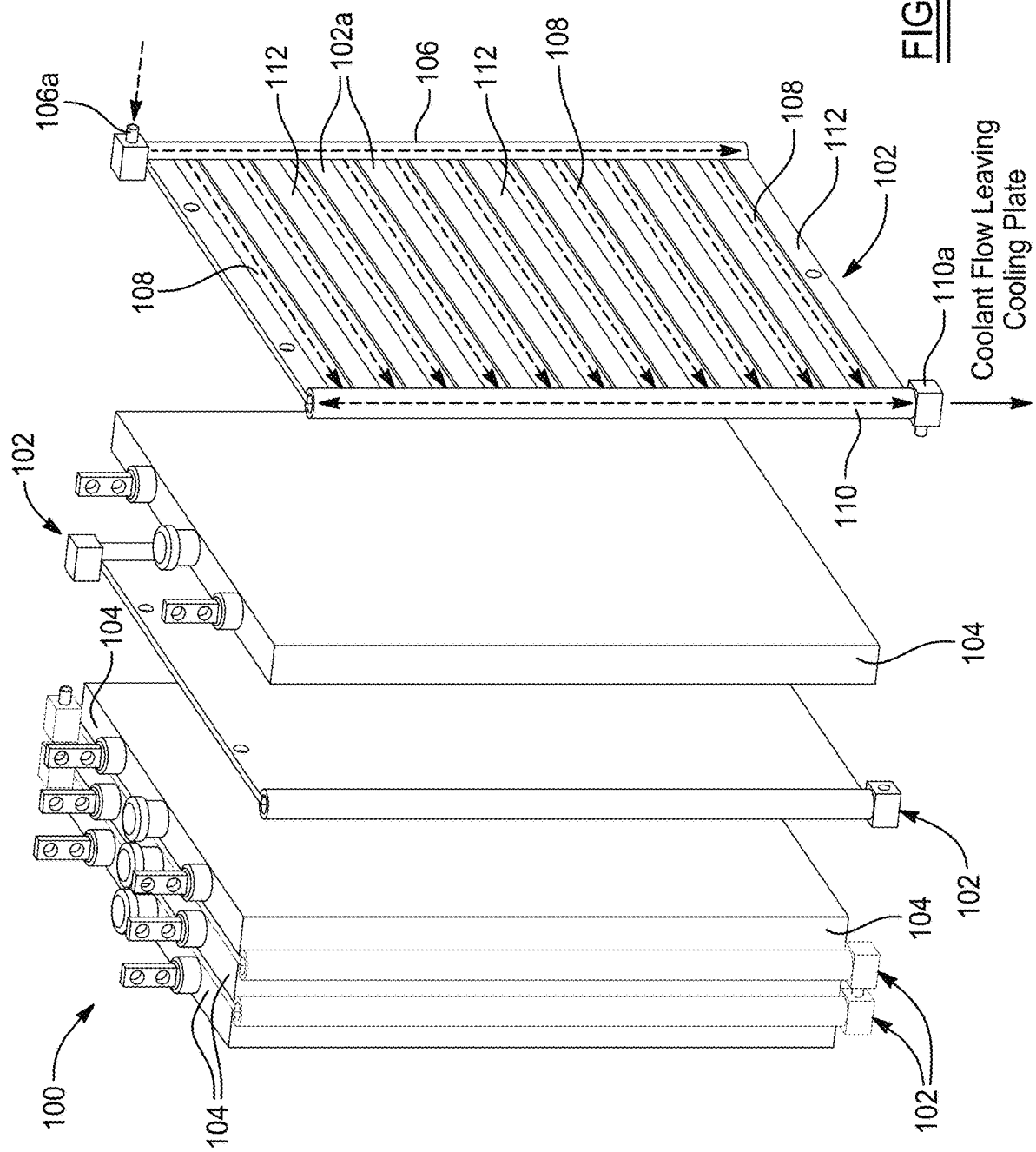
FIG. 2 is a high level exploded perspective illustration of just the energy storage cells and the cooling plates of an energy module constructed in accordance with one example of the present disclosure.

Referring to FIG. 2, a plurality of the major components associated with an energy module 100 are shown in accordance with one embodiment of the present disclosure. The energy module 100 incorporates thin, intercell cooling plates 102 positioned between adjacent battery cells 104 to thermally isolate the cells from each other.

Each cooling plate 102 has an inlet manifold 106 having an inlet port fitting 106a into which the cooling fluid may flow. A plurality of flow channels 108 communicate with the inlet manifold 106 and also with an outlet manifold 110. The flow channels 108 are designated using shading in the figure, as they would ordinarily not be visible when viewing the exterior surface of the fully assembled cooling plate 102.

The outlet manifold 110 includes an outlet port fitting 110a through which the coolant may exit the cooling manifold 110. The flow channels 108 in one embodiment are formed from a plate assembly 112 formed from a pair of material plates (to be discussed in the following paragraphs). The flow channels 108 in this example are formed from the plate assembly 112 so as to be integral portions of the plate assembly 112. The creation of the flow channels 108 results in elongated material sections 112a (FIG. 2) that are present on opposite sides of each one of the flow paths 108. The plate assembly 112 may be formed from any material which has desirable thermal conductive qualities, for example, nickel or copper. At the present time nickel may be preferred because it does not suffer from the material joining limitations that copper suffers from, and thus is ideally suited for laser welding fabrication techniques.

The flow channels 108 of each cooling plate 102 in the example shown in FIG. 2 are formed parallel to one another in straight paths, and the flow channels 108 are all formed to have the same cross sectional diameter and configuration. However, it will be appreciated that the flow channels 108 need not be formed in straight paths, nor do they all necessarily have to have the same cross-sectional diameter and configuration. Curving or serpentine flow paths (i.e., flow paths that are not perfectly straight, parallel flow paths) are also contemplated. It is also possible to configure the flow channels 108 such that certain ones of the flow channels have larger diameter flow paths than others, or that ones of the flow paths have a slightly different cross-sectional configuration than other ones of the flow paths. Accordingly, the construction of the cooling plate 102 is not limited to any precise shape and/or layout of the flow channels 108.

It is also possible each cooling plate 102 within a module 100 may be constructed slightly differently from each other, to match fluid flow distribution to specific battery module applications.

For the energy module 100, the cooling plates 102 enable the cells 104 adjacent to a given failed cell, on both sides of the failed cell, to be maintained near optimal operating temperature when the product of flow rate through the cooling plate 102 times fluid specific heat exceeds the heat conduction rate out of the failed cell. Liquids (water, ethylene glycol, etc.) are the most practical cooling fluid, as high coolant specific heat enables low flow rate. Thermal simulations show cell failure propagation is well suppressed with only 50 cm$^3$/second water flow through each cooling plate 102. The low flow rate results in modest pressure drop from inlet to outlet.

However, module 100 is adaptable to refrigerant gas cooling fluid (i.e., expanded liquid $CO_2$, etc.), with appropriate modifications to accommodate high flow rates that accompany low specific heat coolants.

The cooling plate 102 height and width preferably approximately match the height and width of each cell 104. The height and width of each cooling plate 102 in this example would then preferably be 150×150 mm$^2$ for the nominal cell 104 parameters specified above. Again, however, the dimensions of the cooling plate 102 are not limited to any specific height, width or thickness. These parameters may be dictated at least in part by the construction of the cells with which the cooling plates are designed to work with.

The cooling plate 102 thickness in one embodiment may preferably be less than 10% of the cell thickness to limit the reduction in energy module 100 average energy density. Assuming, for example, 10 mm thick cells 104, the cooling plates may then each be less than about 1 mm thick. A cooling channel 108 thickness may be 0.5 mm, with 0.25 mm wall thickness on each side of each channel.

Fabrication experience shows the cooling channel walls may in some instances become a bit too flexible if the cooling channel 108 width exceeds more than about twelve times the thickness of the plate assembly 112. Hence, in this example the nominal cross section area of each flow channel 108 within the 1 mm thick cooling plate 102 is 6 mm×0.5 mm.

The cooling plate 102 construction materials' thermal conductivity limits the maximum allowable separation between two adjacent flow channels 108. Thermal simulations show adjacent cells are well protected from cell failure propagation without resorting to the highest thermal conductivity materials, such as pure copper or aluminum. Lower conductivity materials such as pure nickel or copper/nickel alloys, which are amenable to a wider variety of material joining options, also provide adequate protection from cell failure. Plastics, which are thermal insulators, are a more challenging construction material choice due to very small cooling channel spacing required, and their brittle nature, but in some limited applications may still be useable.

The cooling flow channel 108 dimensions used in fabricating prototype cooling plates 102 were 0.5 wide×6 mm tall channels, with 13 mm center-to-center spacing between the flow channels 108. Hence, the coolant flow area, which sets the cooling channel 108 flow velocity, in one example, was about 22% of the cooling plate 102 cross sectional area. Dividing the coolant flow rate of 50 $cm^3$/second by a total flow area of all of the flow channels 108 of a cooling plate 102 results in 1.5 meters/second fluid flow speed. Such a speed is sufficiently low to maintain laminar channel flow. Hence, the pressure drop from an inlet of a given flow channel 108 to its outlet is only about 2 psi (14 kPa).

The inlet manifold 106 and the outlet manifold 110 are both fabricated and secured to each cooling plate 102 to ensure approximately equal flow speed in each flow channel 108. This is further illustrated in FIGS. 3 and 4. In this example symmetry is maintained from the cooling plate 102 inlet manifold inlet port fitting 106a to the outlet manifold port fitting 110a, regardless of which flow channel 108 path is taken. Symmetry in the layout of the flow channels 108 and the uniform spacing between the flow channels 108 is also maintained, which ensures approximately equal cooling capacity across the cooling plate's 102 entire surface area. In this example, at one end the intake manifold 106 is closed off by a plug or cap 106b, while the outlet manifold 110 is similarly closed off at one end by a similar plug or cap 110b.

FIG. 4 illustrates thermal plates 114 and 116 that are used to form the plate assembly 112. Each flow channel 108 may be formed using an inner surface 114a and 116a of the thermal plates 114 and 116, respectively, by a suitable process, for example etching, machining, or stamping, to create shallow elongated channels 114b and 116b in each of the thermal plates. The shallow channels 114b,116b are further arranged so that they align with one another when the thermal plates 114 and 116 are pressed against one another and permanently secured, to form the flow channels 108. The channel plates 114,116 may be joined together by laser or resistance welding along portions of both opposing lateral edges 114c and 116c of the thermal plates 114 and 116, and stitch welding the material between channels. Adhesive bonding is not precluded, provided the sealed joints are highly reliable.

With further reference to FIG. 4, each of the inlet manifold 106 and the outlet manifold 110 may be formed as a single piece tubular component. The manifold 106 material is selected for compatibility with the method of joining to the cooling plate 112. While the inlet manifold 106 and the outlet manifold 110 are shown as having a cross-sectional round shape in FIG. 4, it will be appreciated that this is just one example, and the manifolds 106 and 110 are not limited to only round configurations. Each of the manifolds 106 and 110 may be formed to include a slit 106c along a major portion of its length. FIG. 4A illustrates a portion of the inlet manifold 106 showing its slit 106c. The slit 106c is dimensioned so that it can receive a lateral edge of the plate assembly 112 (i.e., which includes the combined thicknesses of the opposing edges 114c and 116c) of the plate assembly 112, and thus enables communication of the cooling fluid through the manifold 106 into the flow channels 108 formed in the plate assembly 112. The outlet manifold 110 may be constructed similarly or identically to the inlet manifold 106. The cooling plates 102 shown in FIG. 3 may be individually leak checked after fabrication, prior to assembly into a battery module.

In one example, fabrication of the parallel flow channels 108 was achieved by chemically etching 0.25 mm deep channels (i.e., channels 114b and 116b in FIG. 4) into 0.5 mm thick flat nickel plate stock (plates 114 and 116 in FIG. 4). Closed flow channels 108 were then formed by laser welding the two etched plates (i.e., plates 114 and 116) together along the two exterior seams parallel to the flow direction. Penetration spot welds between the flow channels 108 provide additional structural rigidity across the entire cooling plate 102 area, and help the cooling plate to resist bowing or deformation while under coolant pressure.

The lateral opposing ends of the plates 114 and 116 that form each cooling plate 102 may be secured, for example by laser welding, to the slits formed in each manifold 106 and 110 (e.g., such as slit 106c in FIG. 4A). The slits 106c distribute fluid flowing through the inlet manifold 106 into each flow channel 108 and out from each flow channel. To complete the flow path, the caps or fittings 106a,106b,110a, 110b (FIGS. 3 and 4), which be stainless steel end caps or fittings, may be secured, for example by laser welding, to the opposing ends of the inlet and outlet manifolds 106 and 110 respectively. The two end fittings 106a and 110a are flow plugs which allow a flow therethrough, while the two caps 106b and 110b also help to construct the flow path from the inlet fitting 106a to the outlet manifold fitting 110a. Vacuum Arc Re-melted (or equivalent) stainless may be used for the manifolds 106 and 110 and the caps/fittings 106a,106b,110a, 110b, to improve laser weld quality when the plates 114/116 are formed from nickel.

Figure 5:
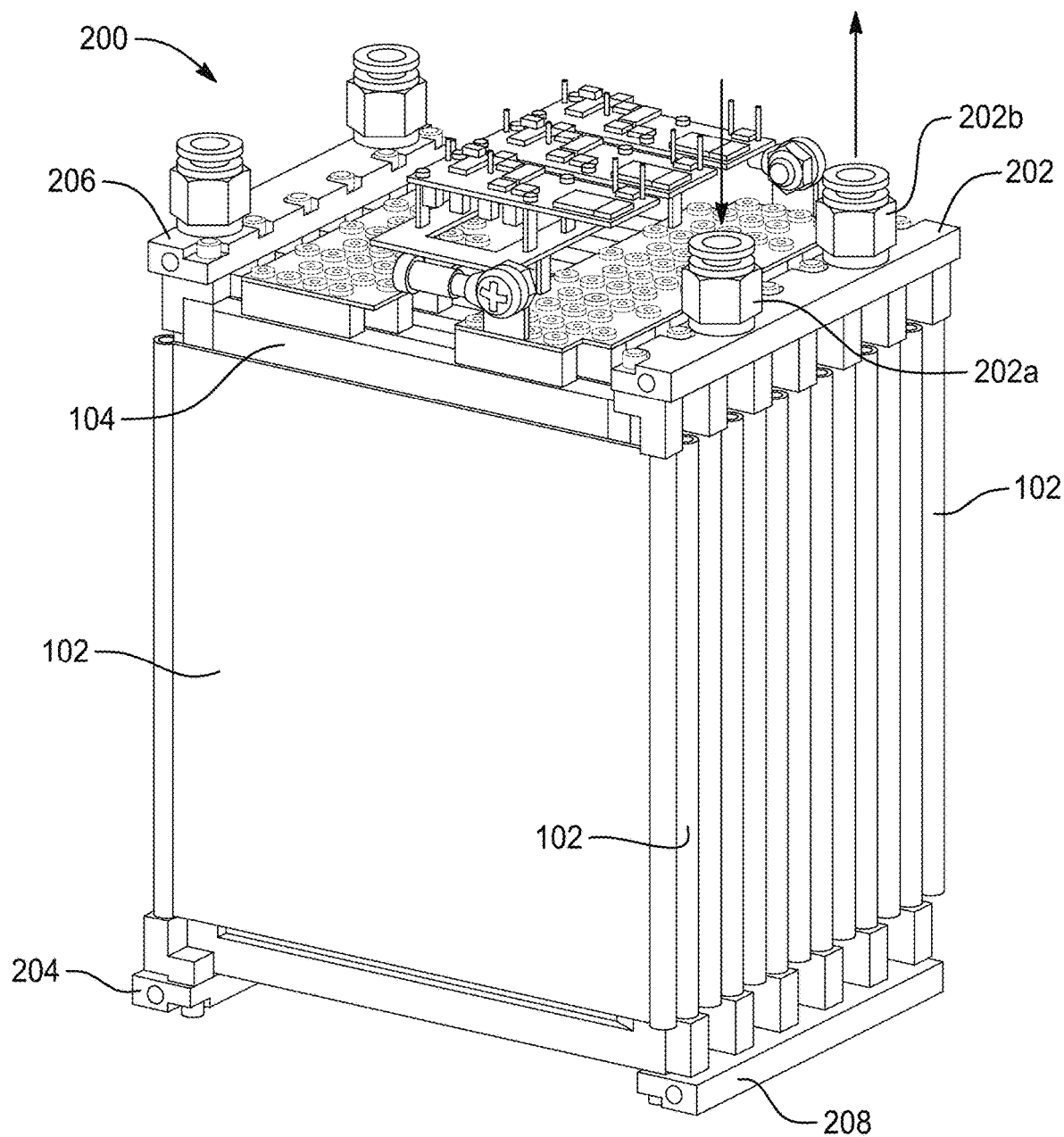
FIG. 5 is a front/top perspective view of one embodiment of an energy storage module incorporating the cooling plates of the present disclosure.
Figure 6:
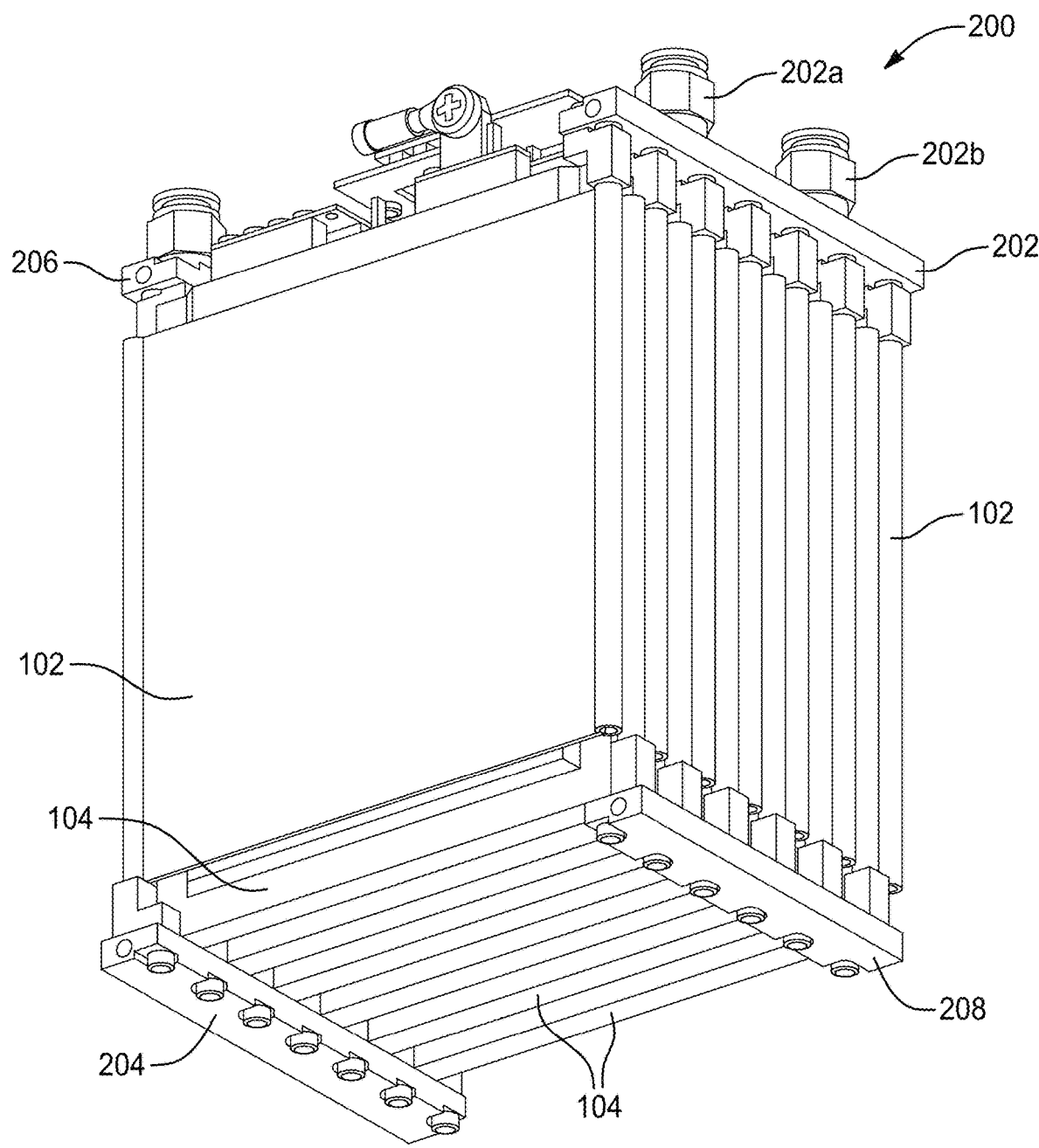
FIG. 6 is a front/bottom perspective view of the energy storage module of FIG. 5 better illustrating the elongated manifolds at the lower area of the module which are used to help circulate fluid between the cooling plates.

One example configuration of a fully assembled energy module 200 built using the foregoing described construction is shown in FIGS. 5 and 6. The energy module 200 in this example is constructed using 12 battery cells 104 separated by cooling plates 102, with two additional cooling plates 102 cooling the exterior surfaces of the two outermost cells on opposing sides of the module. Thermal simulations show neighboring cells 104 are well protected from cell failure propagation, even when one or more individual flow channels 108 within a given cooling plate 102 become blocked.

Cooling manifolds at the module 200 level, as well as the cooling plates 102 themselves, may be arranged/oriented to ensure cell failure propagation protection continues even during flow blockage of an entire cooling plate 102. For example, one elongated supply manifold 202 at the top right of the module 200 shown in FIG. 5 supplies coolant to the first, third and fifth cooling plates 102, in parallel, via an inlet 202a. The manifold outlet 110a from each one of these first, third and fifth cooling plates 102 is coupled to an elongated return manifold 204 at its opposite bottom corner. The coolant flowing through the first, third and fifth cooling plates 102 is fed into and returned using the elongated return manifold 204 which feeds received cooling fluid into the seventh, ninth, eleventh and thirteenth ones of the cooling plates 102 to an outlet 202*b* on the elongated manifold 202. The same flow configuration may be constructed using separate elongated manifolds 206 and 208 for other alternating ones of the cooling plates 102. This parallel/series flow configuration maximizes protection from battery cell 104 failure propagation, while limiting the required flow rate of the cooling fluid. Coolant is supplied to the even numbered cooling plates 102 in an analogous manner through separate supply and return lines formed by the elongated manifolds 206 and 208 at the laterally opposing corners of the module 200. Hence, because all of the cooling plates are not arranged in a strictly serial arrangement (i.e., the output of one feeding into the input of the adjacent cooling plate 102), if any one cooling plate 102 becomes completely blocked, cell failure propagation is limited to just one neighboring cell 104.

As noted herein, it should be appreciated that while a single type of cooling fluid could be flowed through all of the cooling plates 102, two or more different types of cooling fluids could just as readily be flowed through different ones of the cooling plates. Any suitable flowable media which has heat absorbing capability could simultaneously be flowed through different ones of the cooling plates 102. Accordingly, the cooling plates 102 of the various embodiments discussed herein are not limited to use with only one type of cooling medium.

The present system and method substantially reduces or eliminates the risk of cell failure propagation, without compromising the high energy density inherent in the energy storage medium. In a broad sense, the present disclosure makes use of compact temperature control plates with heat removal capacity matched to the energy release of a failed cell of an energy storage module. Placed between each cell in a multi-cell module, the system and method of the present disclosure has been demonstrated to limit cell failure to a single cell. The temperature control plates (i.e., cooling plates 102) may be manufactured sufficiently thin to significantly limit the reduction in average energy density in an energy storage module, and in some instances to limit the reduction in average energy density within an energy storage module to no more than about 10%.

Thermally isolating the energy storage cells 104 from each other with the cooling plates 102, as described herein, also allows faster charge/discharge rates than would otherwise be possible. Operating temperatures which are optimal for extended cell lifetime can thus be more easily maintained. Furthermore, since each cooling plate 102 in the module 100 is constructed as an individual entity, its thermal performance can be fully assured before assembly into an energy storage module. Hence, the present disclosure potentially provides access to new market applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An energy module comprising:
   a plurality of energy generating cells;
   a plurality of cooling plates, each one of said cooling plates having flat, opposing surfaces, and pairs of the plurality of cooling plates being disposed on opposing sides of ones of said plurality of energy generating cells to sandwich each one of said energy generating cells therebetween, and further such that the opposing surfaces of each one of said plurality of cooling plates are in contact with surfaces of an adjacent pair of said energy generating cells;
   each one of said plurality of cooling plates including:
   a plurality of spaced apart coolant flow channels each configured to receive a coolant flow therethrough to limit propagation of heat from one to the other of either one of the adjacent pair of energy generating cells when either one of the adjacent pair of energy generating cells fails;
   an independent, elongated, tubular inlet manifold having a slit running along a length thereof, the slit having a width corresponding to a thickness of the cooling plate to be able to receive a first edge portion of a first lateral side of the cooling plate in the slit, with an interior area of the inlet manifold communicating with each one of the plurality of spaced apart coolant flow channels along a first lateral side of the cooling plate, and supplying the coolant flow to the plurality of spaced apart coolant flow channels;
   an independent, elongated, tubular outlet manifold communicating with each one of the plurality of spaced apart coolant flow channels along a second lateral side of the cooling plate, and receiving the coolant flow from the plurality of spaced apart coolant flow channels;
   a first supply manifold configured to supply only a first subplurality of alternating ones of said independent, elongated tubular inlet manifolds associated with a first subplurality of said cooling plates from first sides thereof, such that said coolant flow flows in a first direction through said first subplurality of cooling plates;
   a second supply manifold configured to supply only a second subplurality of different alternating ones of said independent elongated tubular inlet manifolds associated with a second subplurality of said cooling plates from first sides thereof, such that said coolant flow flows in a second direction opposite to said first direction through said second subplurality of cooling plates;
   a first return manifold in communication with ones of the independent, elongated, tubular outlet manifolds associated with the first subplurality of said cooling plates at the second side of said first subplurality of said cooling plates; and
   a second return manifold in communication with the second subplurality of different alternating ones of said independent elongated tubular manifolds associated with the second subplurality of said cooling plates, at the first sides of second subplurality of cooling plates.

2. The energy module of claim 1, wherein ones of the plurality of spaced apart coolant flow channels are arranged parallel to one another and spaced apart.

3. The energy module of claim 1, wherein each one of said plurality of cooling plates comprises a first wall portion having material portions removed to help form the plurality of spaced apart coolant flow channels, and a second wall portion secured to the first wall portion to fully form the plurality of spaced apart coolant flow channels therein.

4. The energy module of claim 3, wherein the second wall portion also includes material portions removed therefrom which, when the second wall portion is placed against the first wall portion, forms the plurality of spaced apart coolant flow channels.

5. The energy module of claim 2, further comprising: an inlet port fitting for connecting the independent, elongated, tubular inlet manifolds of said plurality of cooling plates to a supply source of the coolant flow; and
   an outlet port fitting for channeling the coolant flow out from the plurality of cooling plates.

6. The energy module of claim 2, wherein the at least one cooling plate is comprised at least partially of at least one of nickel and copper.

7. The energy module of claim 1, wherein:
   each one of said plurality of cooling plates forms a planar component having a first height and a first width,
   each one of said energy generating cells has a second height and a second width; and
   the first height and the first width of each one of said plurality of cooling plates being approximately the same as the second height and the second width of each one of said energy generating cells.

8. The energy module of claim 1, wherein: each one of said plurality of cooling plates has a first thickness;
   each said adjacent pair of energy generating cells has a second thickness; and
   the first thickness is no more than about 10% of the second thickness.

9. The energy module of claim 1, wherein at least one of the plurality of spaced apart coolant flow channels comprises at least one of:
   a linear flow path; and
   a serpentine shape.

10. The energy module of claim 1, wherein ones of the plurality of spaced apart coolant flow channels are arranged parallel to one another and comprise the same cross sectional shape and dimension, and extend from a first longitudinal edge to a second longitudinal edge of its associated said cooling plate.

* * * * *